United States Patent
Lee et al.

(10) Patent No.: US 7,528,923 B2
(45) Date of Patent: May 5, 2009

(54) SYSTEM AND METHOD FOR MANUFACTURING A LIQUID CRYSTAL DISPLAY

(75) Inventors: Jung-Bo Lee, Asan-si (KR); Sang-Myung Byun, Cheonan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 651 days.

(21) Appl. No.: 11/253,436

(22) Filed: Oct. 18, 2005

(65) Prior Publication Data

US 2006/0132700 A1    Jun. 22, 2006

(30) Foreign Application Priority Data

Dec. 17, 2004    (KR) ............... 10-2004-0108167

(51) Int. Cl.
    *G02F 1/13* (2006.01)
(52) U.S. Cl. .................................... 349/187
(58) Field of Classification Search ............ 349/187
    See application file for complete search history.

(56) References Cited

U.S. PATENT DOCUMENTS

2006/0243391 A1 * 11/2006 Onituka ................ 156/358

FOREIGN PATENT DOCUMENTS

| CN | 85109034 A | 8/1986 |
|---|---|---|
| CN | 1154058 A | 7/1997 |

* cited by examiner

*Primary Examiner*—David Nelms
*Assistant Examiner*—Phu Vu
(74) *Attorney, Agent, or Firm*—Hayne and Boone LLP

(57) ABSTRACT

A system for manufacturing a liquid crystal display includes a rotatable stage and a plurality of heads located on the rotatable stage. Each head is separated from each of its neighboring heads by a predetermined distance. The heads are enabled to rotate together with the rotatable stage in order to transport a tape carrier package (TCP). A first head retains the TCP and is located at a first position enabling the TCP to be detected. The first head is located at a second position enabling the first TCP to be pressed. The second position is different from the first position.

16 Claims, 9 Drawing Sheets

SYSTEM AND METHOD FOR MANUFACTURING A LIQUID CRYSTAL DISPLAY

CROSS-REFERENCE TO RELATED APPLICATION

This application claims priority to a corresponding patent application 10-2004-0108167 filed in the Korean Intellectual Property Office, Republic of Korea, on Dec. 17, 2004, the entire content of which is hereby incorporated by reference.

BACKGROUND (a) Field of the Invention

The present invention relates to liquid crystal displays (LCDs) and more particularly to a system and method for efficiently manufacturing LCDs in an automated environment.

(b) Description of Related Art

Liquid crystal displays (LCDs) are widely known and are used in a variety of display environments. An LCD is typically constructed with two panels having field-generating electrodes on interior facing surfaces separated by a generally uniform gap between the panels where the gap is filled by a liquid crystal (LC) layer. The LCD displays images by selectively applying voltages to the field-generating electrodes to generate an electric field in the LC layer. This electric field determines the orientation of LC molecules in the LC layer in order to adjust the polarization of incident light upon the LCD.

Traditionally, the LCD includes a plurality of pixels arranged in an array formation along with a plurality of electrical signal lines for conducting the electric voltage and driving the pixels. For example, these signal lines can be gate lines for transmitting scanning signals or data lines for transmitting data signals. Each pixel typically includes a pixel electrode and a storage electrode. The pixel electrode can be a thin film transistor (TFT) connected between the gate lines and the data lines in order to control the data signals. The storage electrode and the pixel electrode form a storage capacitor for the pixel in order to preserve the data signals for a predetermined amount of time allowing the image on the LCD to remain stable for viewing by an observer.

A liquid crystal (LC) display typically comprises an LC display panel assembly formed by two display panels upon which field generating electrodes are formed, and having an LC layer located in between the two display panels. LC molecules in the LC layer are rearranged by the electric field generated by applying voltages to the electrodes. Accordingly, the transmittance of light passing through the LC layer is controlled by the rearrangement of the LC layer. The LC display panel assembly further includes a plurality of signal lines for transmitting the voltages to the LC display panel assembly and the field generating electrodes.

A driving circuit connected to the signal lines supplies the control voltages to generate the electric fields that rearrange the molecules of the LC layer. The driving circuit can be a single integrated circuit (IC) chip, or can be a part of a larger electronic circuit. The driving IC chip can be affixed to a flexible printed circuit (FPC) film and electrically connected to the LCD by a plurality of conductive lead lines carried on an insulation film, such as a polyimide film. A FPC film carrying an IC chip is generally referred to as a tape carrier package (TCP) where the IC chip is affixed to the FPC film by a tape automated bonding (TAB) process. The bonded IC chip is electrically connected to the signal lines of the LC display panel assembly through the lead lines of the TCP.

As described, the lead lines of the TCP include a plurality of output side lead lines and a plurality of input side lead lines that are connected, respectively, to the output terminals and input terminals of the IC chip. The signal lines of the LC display panel assembly include a plurality of connecting pads, or bonding pads, formed on edges of the LC display panel assembly. The output side lead lines of the TCP can be electrically connected to the connecting pads by a bonding device, for example, while the input side lead lines of the TCP can be soldered to a printed circuit board (PCB) in order to transmit the various control signals to the IC chip.

When the output side terminals of the TCP and the connecting pads of the LC display panel assembly are connected together, an anisotropic conductive film (ACF) is typically located in between. After the ACF is positioned between the output side terminals of the TCP and the connecting pads, the TCP is pressed to the connecting pads of the LC display panel assembly. However, since a first process for identifying the output side terminals of the TCP and a second process for pressing the connecting pads together are typically performed in sequence with the TCP at a single location prior to pressing, the total average cycle time (TACT) for this identifying and pressing may be increased.

The discussion in this section is only intended to enhance the understanding of the present invention, and should not be considered as an admission concerning prior art.

SUMMARY

A system and a method for manufacturing a liquid crystal display (LCD) in a reduced total average cycle time (TACT) are disclosed. According to a first embodiment of the present invention, a system for manufacturing a liquid crystal display includes a rotatable stage and a plurality of heads that are disposed on the rotatable stage. Each head is separated from each of its neighboring heads by a predetermined distance. The heads are enabled to rotate together with the rotatable stage in order to transport a tape carrier package (TCP). A first head retains the TCP and is located at a first position enabling the TCP to be detected. The first head is located at a second position enabling the first TCP to be pressed. The second position is different from the first position.

According to a second embodiment of the present invention, a system for manufacturing a liquid crystal (LC) display includes a pressing assembly configured to press a TCP, a plurality of supplying units, and a plurality of transferring units. Each supplying unit is configured to supply TCPs. Each transferring unit is configured to transfer a supplied TCP from a supplying unit to the pressing assembly.

According to a third embodiment of the present invention, a method for manufacturing a liquid crystal (LC) display includes the operations of transferring a first tape carrier package (TCP) from a first supplying unit to a pressing assembly, picking up the first TCP with a pressing assembly first head, receiving a second TCP from a second supplying unit while the pressing assembly first head is picking up the first TCP, and receiving a third TCP from the first supplying unit while the pressing assembly second head is picking up the second TCP. The pressing assembly includes a plurality of heads where each head is adapted to pick up a TCP.

According to a fourth embodiment of the present invention, a method for manufacturing a liquid crystal (LC) display includes picking up a tape carrier package (TCP) using a first head, rotating the first head holding the TCP and subsequently aligning the TCP, rotating the first head holding the aligned TCP and subsequently detecting the aligned TCP, and rotating the first head holding the detected TCP and subsequently pressing the detected TCP on a LC display panel assembly.

BRIEF DESCRIPTION OF THE DRAWINGS

The present invention will become more apparent by describing embodiments thereof in detail with reference to the accompanying drawings in which.

Figure 1:
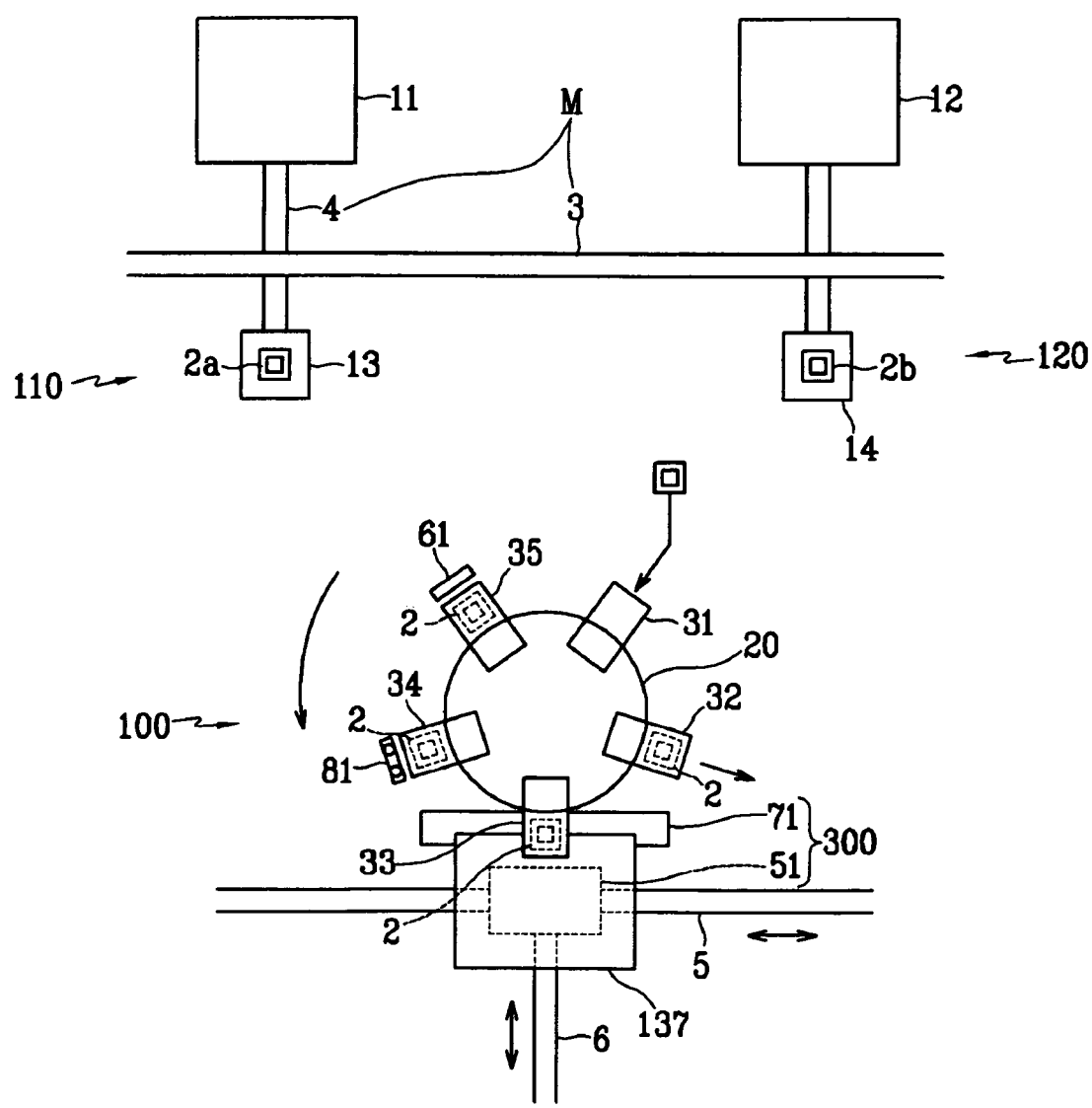
FIG. 1 shows a schematic view of a system for manufacturing a liquid crystal display (LCD), in accordance with an embodiment of the present invention.

In the drawings, the thickness of layers, films, and regions may be exaggerated for clarity. Embodiments of the present invention and their advantages are best understood by referring to the detailed description that follows. It should be appreciated that like reference numerals are used to identify like elements illustrated in one or more of the figures.

DETAILED DESCRIPTION

The present invention will now be described more fully with reference to the accompanying drawings, in which preferred embodiments of the invention are shown. The present invention may, however, be practiced in many different forms and should not be construed as limited to only the embodiments set forth or enumerated herein.

FIG. 1 shows a schematic view of a system for manufacturing a liquid crystal display (LCD) including a pressing assembly 100 for pressing a tape carrier package (TCP) 2 onto an LC display panel 137, a first TCP supplying unit 11, and a second TCP supplying unit 12. First supplying unit 11 provides a first TCP 2a to a first transferring unit 110 while second supplying unit 12 provides a second TCP 2b to second transferring unit 120. In this manner, supplying units (11, 12) and transferring units (110, 120) alternately supply TCPs (2a, 2b) to pressing assembly 100.

Pressing assembly 100 includes a rotatable stage 20, supporting a plurality of carrier heads (31-35) located at a peripheral edge of rotatable stage 20. In particular, a first head 31, a second head 32, a third head 33, a fourth head 34, and a fifth head 35 are placed in an arc located at the peripheral edge of rotatable stage 20 where each head (31-35) is separated from its neighboring heads by a predetermined distance along the peripheral edge of rotatable stage 20 defining a uniform gap between heads (31-35). The location of the heads on the arc possesses rotational symmetry so that each head follows the same circular path during rotation of the rotatable stage 20. Although rotatable stage 20 is shown as a circular member, other geometries are acceptable, such as a square or hexagon, where a head is located at each of the vertices.

The predetermined separation distance between neighboring heads corresponds to a predetermine separation angle during rotation of rotatable stage 20 past a fixed reference point adjacent to rotatable stage 20. Although five heads are shown and described, the number of heads is not considered limiting and may comprise two heads, five heads, six heads, eight heads, or more. In this embodiment, each head (31-35) can receive a TCP 2 and transport the received TCP 2 through a predetermined angle as rotatable stage 20 advances.

Pressing assembly 100 further includes an aligning unit 61, a detecting unit 81, and a pressing unit 300 that are respectively positioned adjacent to rotatable stage 20 at the same corresponding separation distance between the heads so that when a predetermined fourth head 34 is properly aligned with detecting unit 81, then neighboring heads (35, 33) are respectively aligned with aligning unit 61, and pressing unit 300. Following an incremental rotation to a next alignment position, when rotatable stage 20 rotates so that a fifth predetermined head 35 is properly aligned with detecting unit 81, then neighboring heads (31, 34) are respectively aligned with aligning unit 61, and pressing unit 300. In this manner, aligning unit 61, detecting unit 81, and pressing unit 300 are located respectively at stations around the rotatable stage 20 so that a TCP carried on a predetermined head can be transported between the stations.

As a further explanation, a system for manufacturing a LCD according to an embodiment of the present invention will hereinafter be described on the basis of an operation of first head 31. To begin, first head 31 picks up and retains a first TCP transferred from first supplying unit 11 conveyed by first transferring unit 110 to a first station corresponding to the location of first head 31 as shown in FIG. 1. For example, first head 31 may pick up the first TCP using a vacuum (not shown).

After picking up the first TCP, rotatable stage 20 advances by rotating a predetermined incremental angle in a counter clockwise direction as shown in FIG. 1 so that first head 31 is positioned at a second station and adjacent to aligning unit 61 which aligns first TCP within pickup head 31 for one or more subsequent operations. Alignment can include shifting or rotation of the TCP 2 within first head 31 so that the TCP is properly positioned. After this, rotatable stage 20 rotates again by the predetermined angle so that first head 31 is positioned at a third station adjacent to detecting unit 81 which determines whether the TCP 2 located in first head 31 is properly aligned. Detecting unit 81 can include an optical sensing device such as a charge coupled device (CCD) camera in order to objectively determine the presence and proper orientation of a TCP in the third station adjacent to detecting unit 81.

After this, rotatable stage 20 again rotates by the predetermined angle so that first head 31 is at a fourth station adjacent to pressing unit 300. Pressing unit 300 is positioned below the first head 31 located at the fourth station. Pressing unit 300 includes a fixed stage 71 for supporting the TCP and a moving stage 51 for moving an LC display panel assembly to the fixed stage 71. Moving stage 51 includes a vertical moving member 6 and a horizontal moving member 5 that impart linear vertical and horizontal movement to moving stage 51. Each moving member (5, 6) is activated by a motor to move back and forth along orthogonal axes.

Similarly, each transferring unit (110, 120) includes a supporting member (13 and 14), respectively, for carrying a TCP 2 dispensed by the corresponding supplying unit (11, 12) to the first station so that pressing assembly 100 may receive the dispensed TCP. Each supporting member (13, 14) is moved by horizontal and vertical moving members (3, 4) designated together as a moving unit M. In particular, moving unit M is driven by the motion of vertical linear motor 4 and a horizontal linear motor 3 that impart linear horizontal and linear vertical movement to supporting members (13, 14). In this manner, while the first transferring unit 110 transfers the first TCP 2a from the first supplying unit 11 to the pressing assembly 100, the second transferring unit 120 extracts the second TCP 2b from the second supplying unit 12.

After the TCP 2 is detected by the detecting unit 81, the first TCP 2 is pressed to a first LC display panel assembly 137. LC display panel assembly 137 may have several components including a thin film transistor array (TFT array) panel (not shown), a color filter array (CFA) panel (not shown) opposite the TFT array panel, and an LC layer (not shown) disposed in between the TFT and CFA panels. Typically, a TFT array panel (not shown) includes a plurality of pixel electrodes (not shown) arranged in a matrix. In this case, a plurality of thin film transistors (not shown) selectively transmit signals to the pixel electrodes, and a plurality of gate lines and data lines (not shown) connected to the thin film transistors. A proper orientation of the TCP 2 during detection includes identifying the location of the output side terminals and determining they are positioned for making a proper electrical connection with the plurality of gate lines and data lines (not shown) after pressing.

As described above, before the TCP 2 of the first head 31 is pressed by pressing unit 300, the TCP 2 is first aligned by aligning unit 61 in a first location and then detected by detecting unit 81 in a second location. The alignment and detection occur in sequence prior to pressing the first TCP in the pressing unit 300. Since the spacing between heads (31-35) on rotatable stage 20 and the distance between stations one through four are correspondingly uniform, detection of proper alignment of second head 32 adjacent to detecting unit 81 implies that first head 31 is aligned with pressing unit 300. In this manner, alignment of a third TCP 2 at the second station may be accomplished at the same time as receipt of a fourth TCP 2 at the first station so that receipt, alignment, detection, and pressing may be nearly simultaneously accomplished so that a total average cycle time (TACT) of a pressing process becomes shorter.

For example, when an embodiment includes five equally spaced heads on rotatable stage 20, a rotation angle describing the gap between each neighboring head for each incremental rotation becomes 72-degrees. When an embodiment includes six equally spaced heads (not shown) on rotatable stage 20, a rotation angle describing the gap between each neighboring head for each incremental rotation becomes 60-degrees. In this manner, as the rotating angle, or gap, becomes smaller the total average cycle time (TACT) of an operation of the rotatable stage 20 can be reduced.

It is understood that a pressing operation by pressing unit 300 would not be actuated if the TCP in a head located at the pressing unit in the previous rotation step was not properly detected by detecting unit 81. In this case, any TCP located in a predetermined head at the third station adjacent to detecting unit 81 would be declared improper so that the pressing operation by pressing unit 300 would not be performed on the improper TCP. Following a subsequent rotation of rotatable stage 20, the improper TCP would be located at a fifth station where the improper TCP is discarded from rotatable stage 20. A control unit (not shown) is configured to receive data signals from the detecting unit 81 and provide control signals to the aligning unit 61, the pressing unit 300, the supplying units (11, 12), and the transferring units (110, 120).

Figure 2:
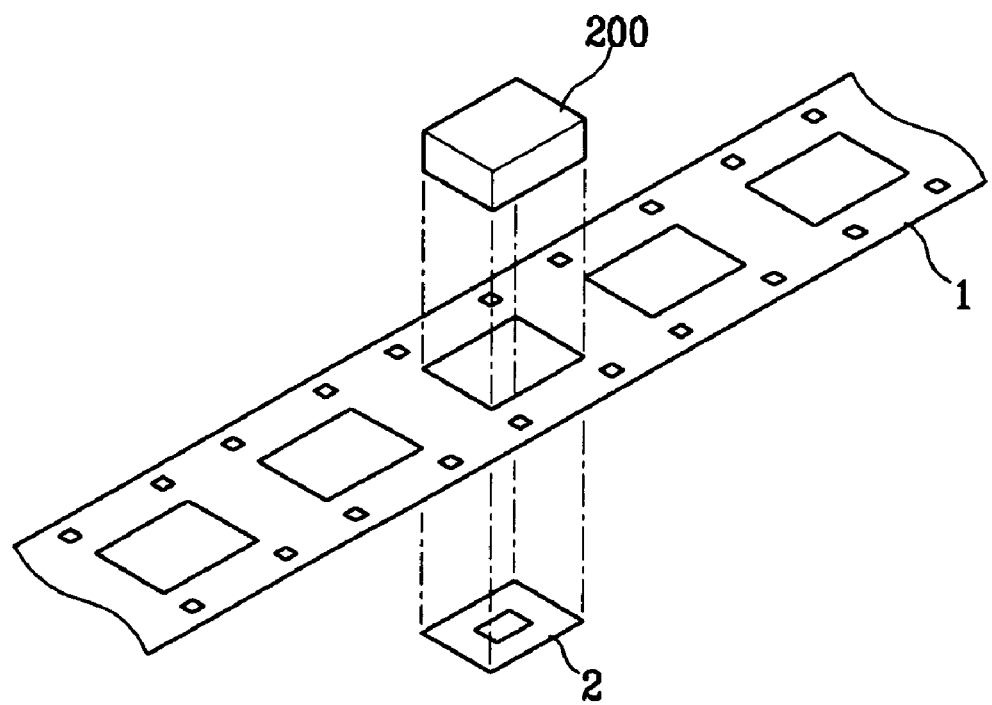
FIG. 2 shows a perspective view of the separation of a tape carrier package (TCP) from a tape carrier reel by a stamping cutter.

FIG. 2 shows a perspective view of the separation of a tape carrier package (TCP) from a tape carrier reel 1 by a stamping cutter 200. Each of the first and second supplying units (11, 12) includes a stamping cutter 200 for separating the TCP 2 from a TCP reel 1. In various embodiments, the TCP 2 may be provided with a film (not shown), lead lines (not shown) and a driving IC chip (not shown) attached on the film. As described above in reference to both FIGS. 1 and 2, since multiple supplying units (11, 12) and transferring units (110, 120) are available, the total time consumed in supplying the first and second TCPs (2a, 2b) to the pressing assembly 100 can be reduced significantly.

Figure 3:
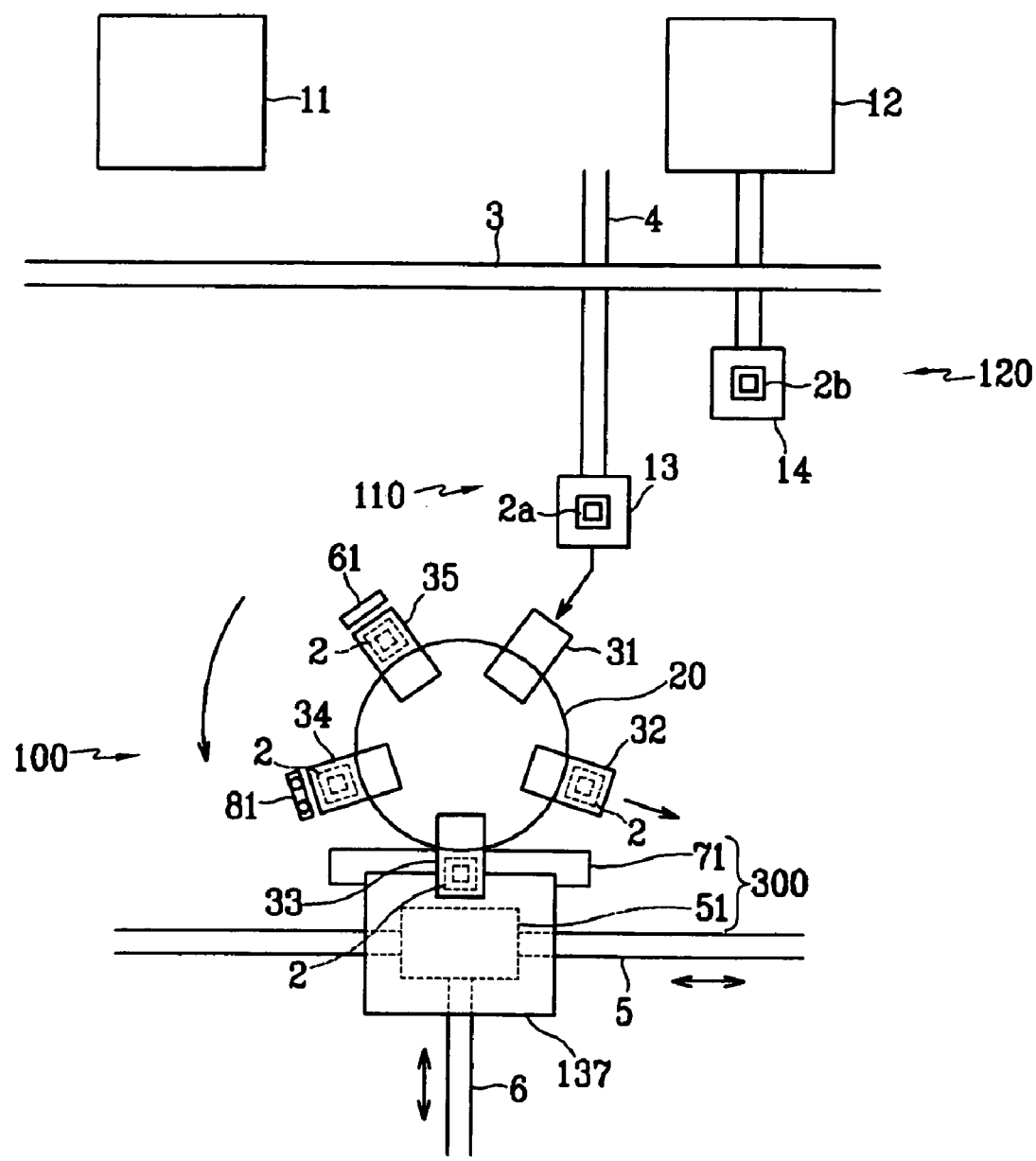
FIGS. 3-4 show the operation of a plurality of TCP suppliers, in accordance with an embodiment of the present invention.
Figure 4:
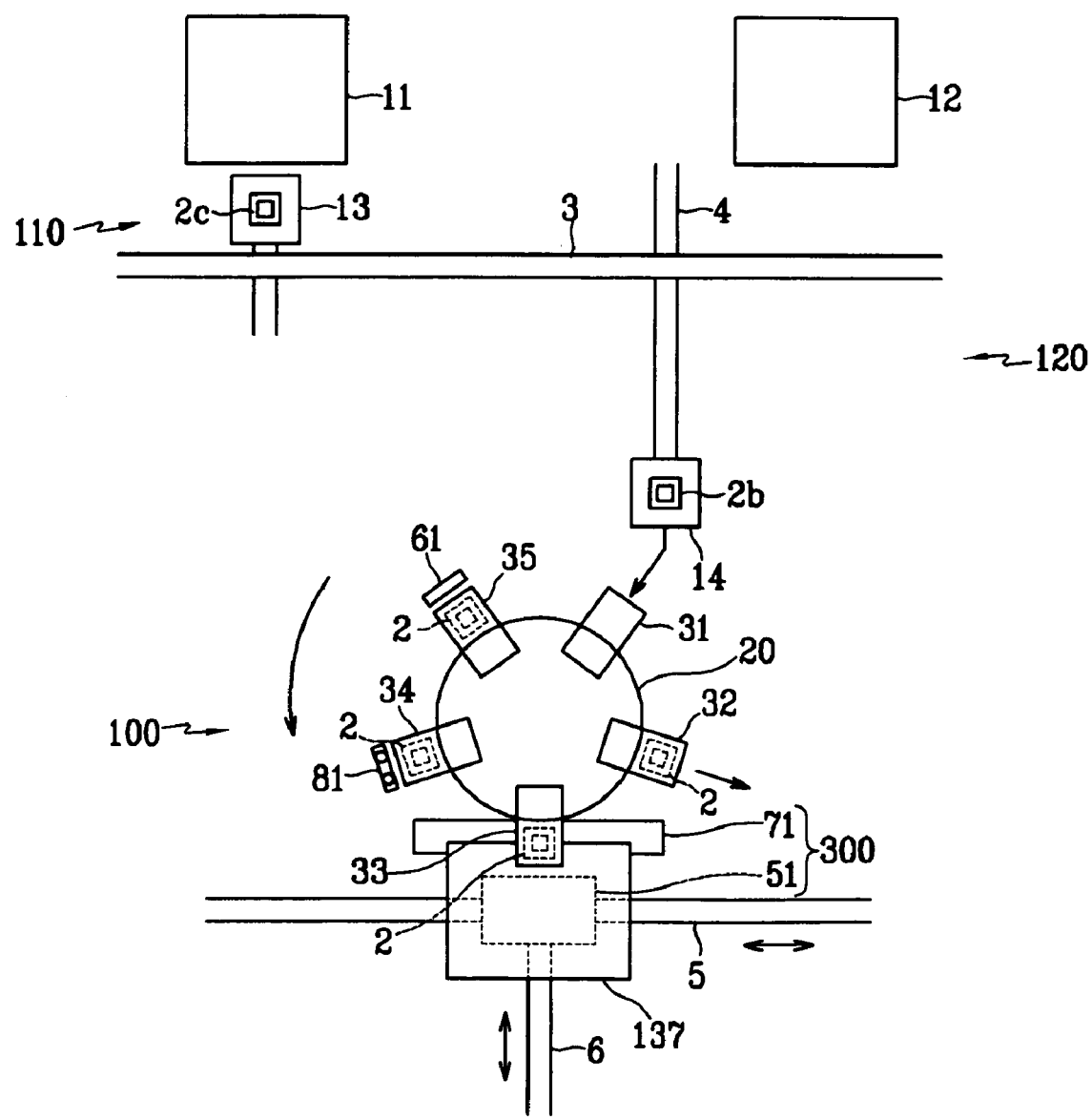
Figure 5:
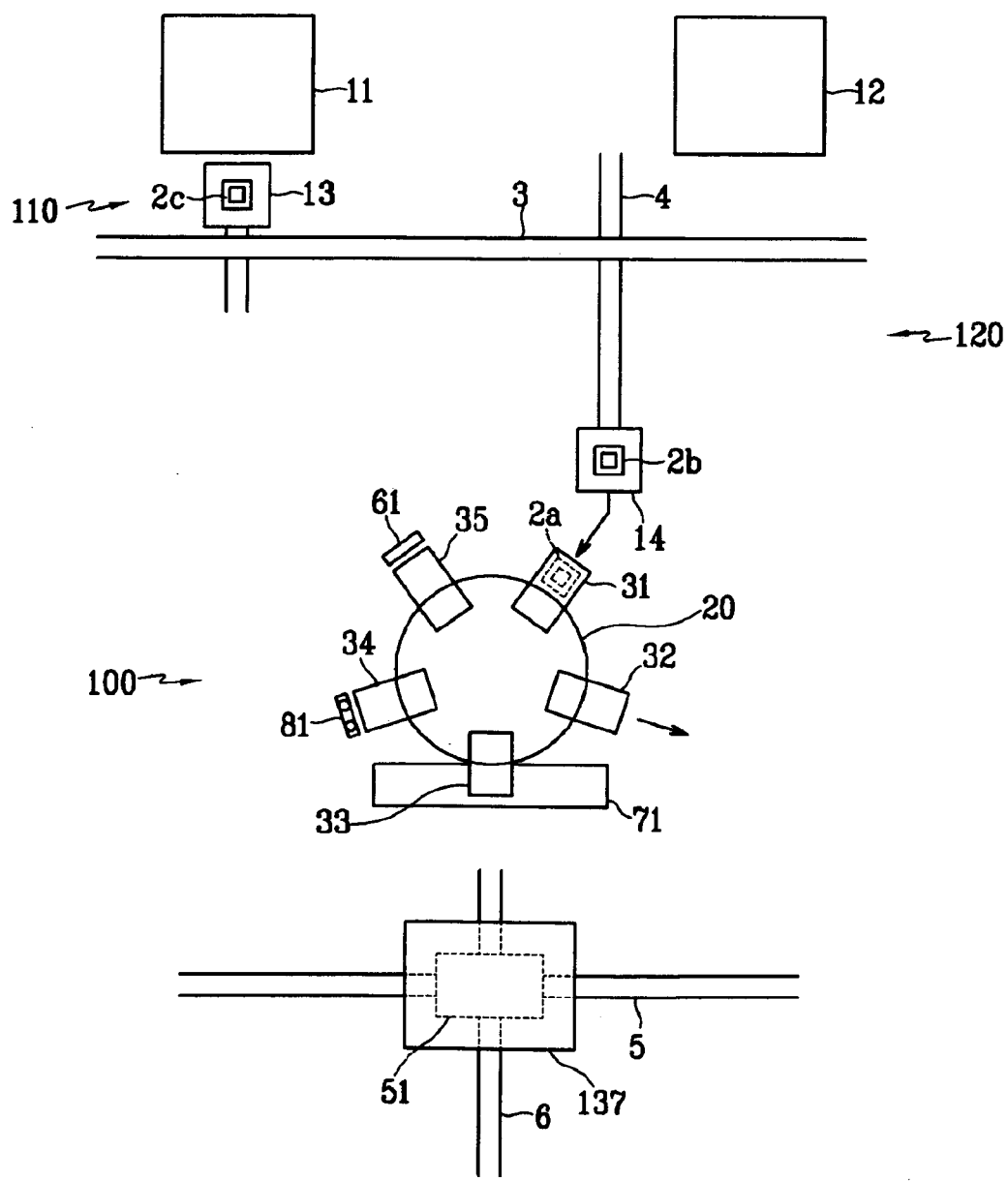
FIGS. 5-9 show a sequence of LCD manufacturing stages, in accordance with an embodiment of the present invention.

FIGS. 3-4 show the operation of a plurality of TCP suppliers, in accordance with an embodiment of the present invention. A method for manufacturing a LC display according to an embodiment includes the following operations.

In reference to FIG. 3, the first TCP 2a supplied from the first supplier 11 is positioned at the first station below the first head 31 of the pressing assembly 100 by first transferring unit 110 onto supporting member 13, and the first head 31 picks up the dispensed first TCP 2a. While the first transferring unit 110 is transferring first TCP 2a from the first supplier 11 to pressing assembly 100, second transferring unit 120 extracts second TCP 2b dispensed from second supplying unit 12 onto second supporting member 14 located adjacent to second supplying unit 120.

In reference to FIG. 4, the TCP 2b is positioned at the first station below the first head 31 of the pressing unit 100 by second transferring unit 120 upon second support member 14, and is standing by ready to be picked up by first head 31. At the same time, first transferring unit 110 extracts a third TCP 2c from the first supplying unit 11. In an alternating fashion, while a first TCP 2a is transferred to pressing assembly 100, a second TCP 2b is prepared for transfer. Similarly, while the second TCP 2b is transferred to pressing assembly 100, the third TCP 2c is prepared for transfer. Through the use of multiple transferring units (110, 120), TCP 2 may be rapidly supplied to the pressing assembly 100, and the TACT can be reduced.

FIGS. 5-9 show schematic views illustrating a sequence of LCD manufacturing phases. In reference to FIG. 5, a first phase includes operations where first head 31 picks up a first TCP 2a transferred from a first supplying unit 11 by a first transferring unit 110. After this, first transferring unit 110 returns to a position adjacent to first supplying unit 11 to await extraction of a third TCP 2c. While first transferring 110 is awaiting extraction of the third TCP 2c, the second transferring unit 120 receives an extracted second TCP 2b from second supplying unit 12, and positions the second TCP 2b below first head 31 ready for pickup.

Figure 6:
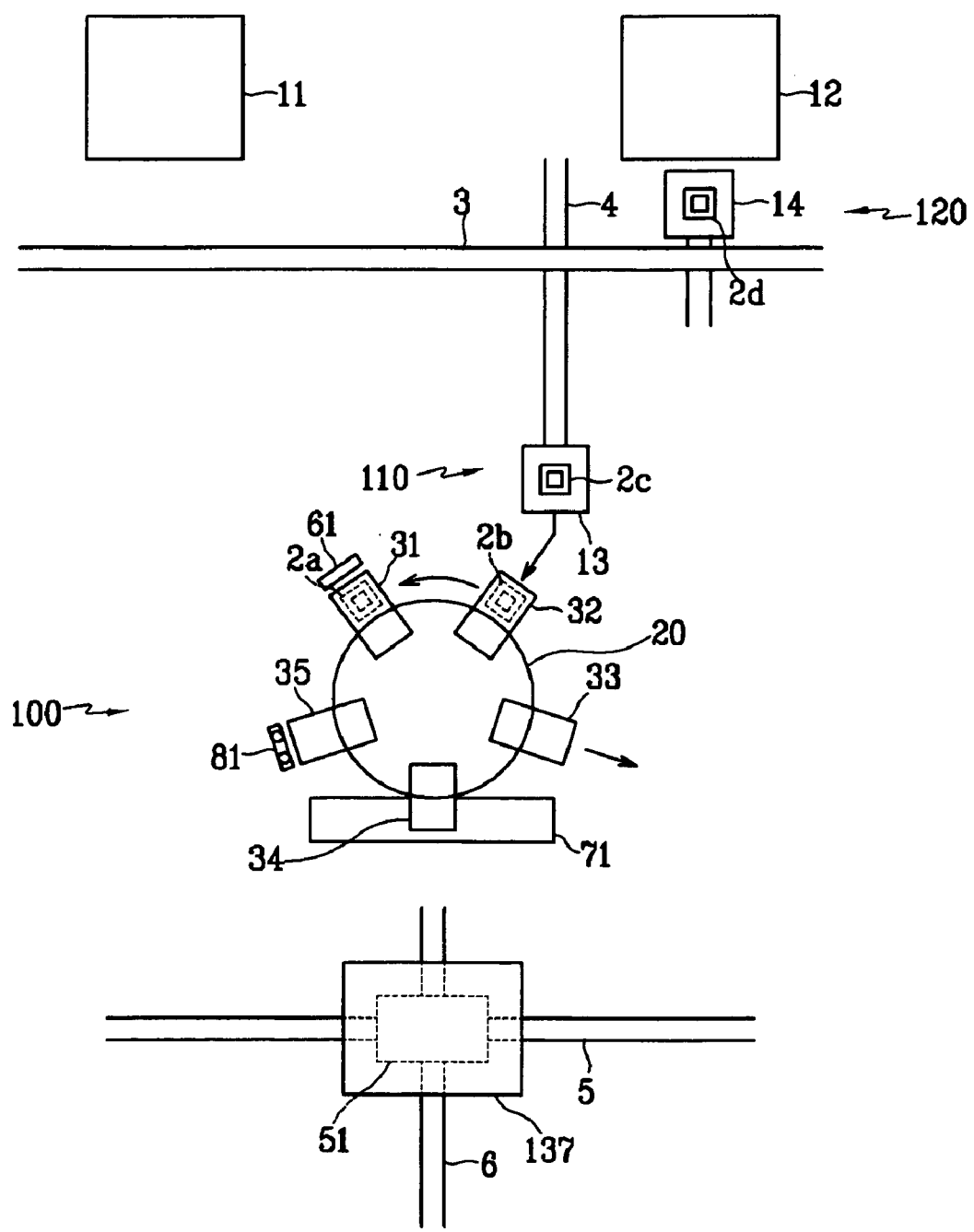

In reference to FIG. 6, a second phase includes operations where rotatable stage 20, starting at a first station, rotates by the predetermined angle so that first head 31 is now located at a second station adjacent to aligning unit 61. After this, aligning unit 61 aligns the first TCP 2a. At the same time, second head 32 picks up the second TCP 2b transferred by the second transferring unit 120 and positioned at the first station adjacent to rotatable stage 20 ready for pickup. In this manner, a new TCP is alternately supplied by the plurality of supplying units (11, 12) in turn to pressing assembly 100. After this, second transferring unit 120 returns to second supplying unit 12, and extracts the fourth TCP 2d. At the same time, first transferring unit 110 extracts the third TCP 2c from first supplying unit 11, and positions the third TCP 2c below second head 32 located at the first station ready for pickup.

Figure 7:
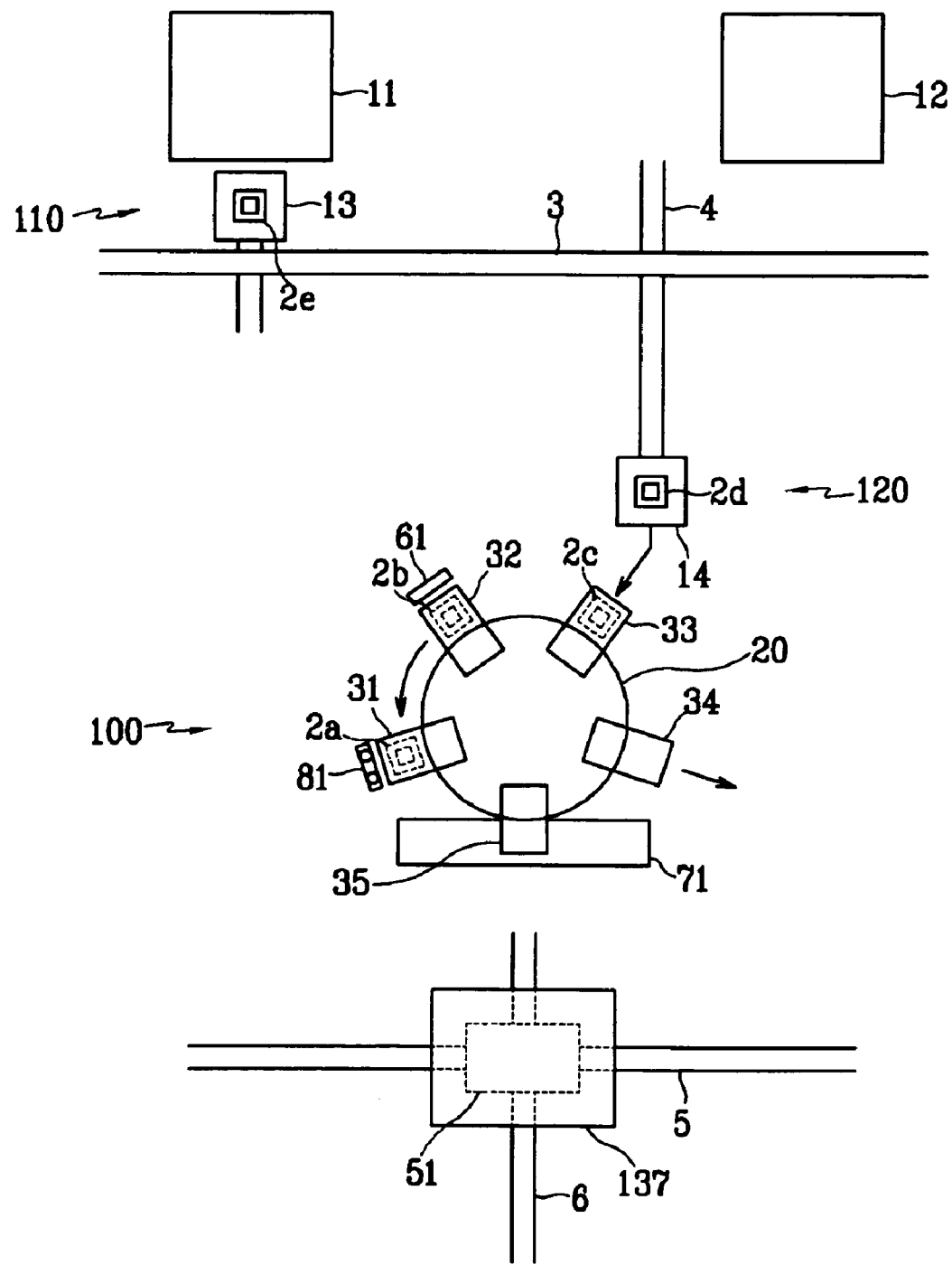

In reference to FIG. 7, a third phase includes operations where rotatable stage 20 rotates by the predetermined angle, so that first head 31 is positioned at a third station adjacent to detecting unit 81. After this, detecting unit 81 detects the presence and proper orientation of the first TCP 2a supported by first head 31. At about the same time, third head 33 picks up the third TCP 2c transferred by the first transferring unit 110 located at the first station. Thereafter, the first transferring unit 110 returns to the first supplying unit 11, and awaits extraction of a fifth TCP 2e. At about the same time, second transferring unit 120 receives the extracted fourth TCP 2d from second supplying unit 12, and positions the fourth TCP 2d below the third head 33 ready for pickup. In reference to the disclosed operations, the term simultaneously includes the operations performed at about the same time.

Figure 8:
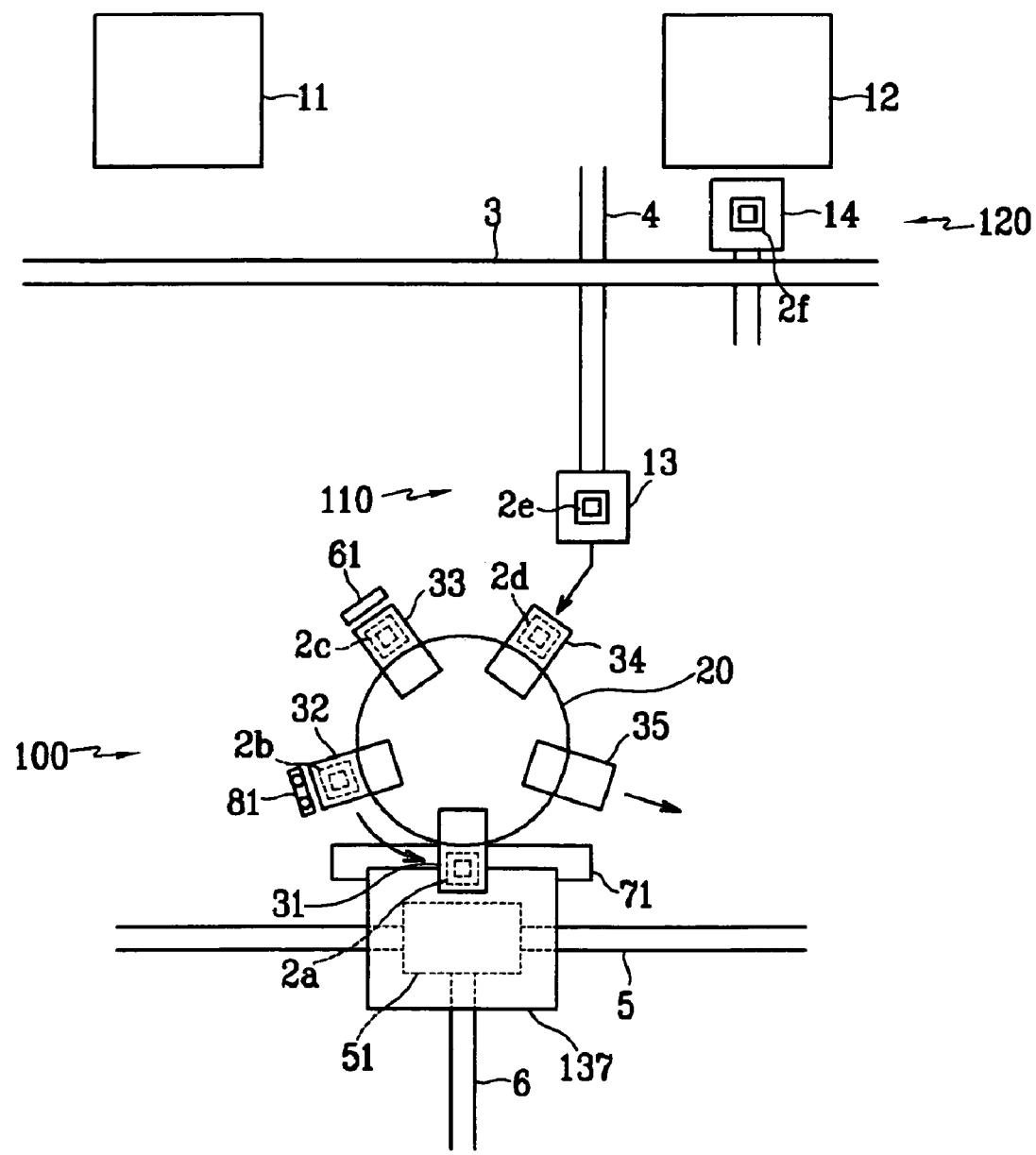

In reference to FIG. 8, a fourth phase includes operations where rotatable stage 20 rotates by the predetermined angle, and so that first head 31 is positioned at a fourth station adjacent to pressing unit 300. As described above, moving stage 51 is moved by the horizontal and vertical moving members (5, 6), in order to position the LC display panel assembly 137 on fixed stage 71. An anisotropic conductive film is disposed on a gate line pad (or a data line pad) of the LC display panel assembly 137 loaded on the moving stage 51, and then the first TCP 2a is pressed on the anisotropic conductive film by pressing unit 300. In this manner, pressing unit 300 presses the first TCP 2a detected by the detecting unit 81 to the LC display panel assembly 137. The anisotropic conductive film may be formed by scattering an electrically conducting particle into a thermosetting resin film (or a thermoplastic resin film), for example.

At about the same time that pressing unit 300 is pressing the first TCP 2a, fourth head 34 picks up the fourth TCP 2d transferred by the second transferring unit 120. After this, second transferring unit 120 returns to second supplying unit 12, and awaits extraction of a sixth TCP 2f. At the same time, the first transferring 110 receives the extracted fifth TCP 2e from the first supplier 11, and positions the fifth TCP 2e below the fourth head 34 ready for pickup.

Figure 9:
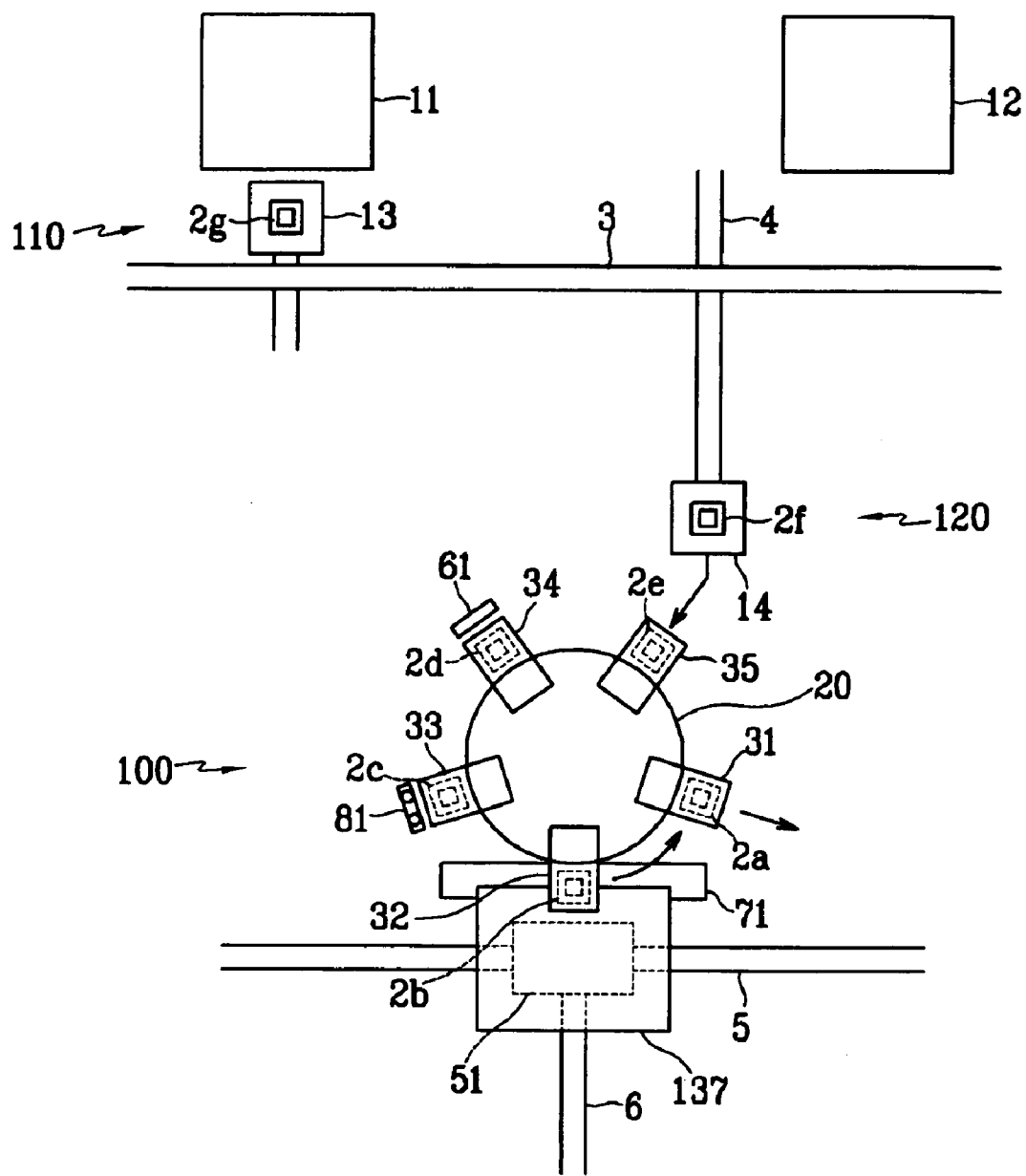

In reference to FIG. 9, an occasional fifth phase includes operations where a defective, undesirable, or improperly oriented TCP is detected by detecting unit 81 and is not pressed on the LC display panel assembly 137 during the pressing phase. For example, if TCP 2a was detected as defective, in this fifth phase the first head 31 holding the defective TCP 2a is rotated by the same incremental rotation amount, and is subsequently removed from the first head 31 in a discarding operation.

At about the same time, fifth head 35 picks up the fifth TCP 2e transferred by first transferring unit 110. After this, first transferring unit 110 returns to first supplying unit 11, and extracts a seventh TCP 2g. At about the same time, second transferring unit 120 receives the extracted sixth TCP 2f from second supplying unit 12, and positions the sixth TCP 2f below the fifth head 35 ready for pickup.

In view of the discussion above, systems and methods for manufacturing an LC display according to embodiments of the present invention may include one or more of the following advantages. Since the detecting unit 81 and the pressing unit 300 are separate, a sequential manufacturing process including detecting and pressing the TCP can be rapidly performed. Further, since multiple supplying units (11, 12) and transferring units (110, 120) are provided, a TCP can be rapidly supplied to pressing assembly 100 so that the total average cycle time (TACT) of manufacture can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Further, while the present invention has been described in detail with reference to the preferred embodiments, those skilled in the art will appreciate that various modifications and substitutions can be made thereto without departing from the spirit and scope of the present invention as set forth in the appended claims.

We claim:

1. A system for manufacturing a liquid crystal (LC) comprising:
   a rotatable stage; and
   a plurality of heads disposed on the rotatable stage, each head being separated from each of its neighboring heads by a predetermined distance, the heads being enabled to rotate together with the rotatable stage in order to transport a tape carrier package (TCP), a first head retaining the TCP and being disposed at a predetermined first position enabling the TCP to be detected, the first head being disposed at a second position enabling the first TCP to be pressed, the second position being different from the first position.

2. The system of claim 1, wherein the rotatable stage includes a peripheral edge, the plurality of heads being disposed in an arc at the peripheral edge of the rotatable stage.

3. The system of claim 1, wherein a second head adjacent to the first head retains a second TCP, the first TCP being pressed and the second TCP being detected simultaneously.

4. The system of claim 1, wherein the number of heads is five.

5. A system for manufacturing a liquid crystal (LC) display comprising:
   a pressing assembly configured to press a tape carrier package (TCP);
   a plurality of supplying units, each supplying unit being configured to supply TCPs; and
   a plurality of transferring units, each transferring unit being configured to transfer a supplied TCP from a supplying unit to the pressing assembly.

6. The system of claim 5, wherein the pressing assembly comprises:
   a rotatable stage; and
   a plurality of heads disposed on the rotatable stage, each head being separated from each of its neighboring heads by a predetermined distance, the heads being enabled to rotate together with the rotatable stage in order to transport a tape carrier package (TCP), a first head retaining the TCP and being disposed at a predetermined first position enabling the TCP to be detected, the first head being disposed at a second position enabling the first TCP to be pressed, the second position being different from the first position.

7. The system of claim 6, wherein the pressing assembly further comprises:
   an aligning unit configured to align the TCP supplied to the predetermined head;
   a detection unit configured to detect the TCP aligned by the aligning unit; and
   a pressing unit configured to press the aligned and detected TCP together with an LC display panel assembly.

8. The system of claim 7, wherein the first position is disposed before the detection unit.

9. The system of claim 7, wherein the second position is disposed before the pressing unit.

10. The system of claim 7, wherein the rotatable stage includes a peripheral edge, the plurality of heads being disposed in an arc at the peripheral edge of the rotatable stage.

11. The system of claim 7, wherein a second head adjacent to the first head retains a second TCP, the first TCP being pressed and the second TCP being detected simultaneously.

12. The system of claim 6, wherein the number of heads is five.

13. The system of claim 6, wherein each of the transferring units comprises:

a supporting member for holding the TCP; and a moving unit for moving the supporting member.

14. The system of claim 13, wherein the moving unit further comprises:

a vertical moving member; and a horizontal moving member.

15. The system of claim 6, wherein the number of supplying units is two, the two supplying units being a first supplying unit and a second supplying unit, and wherein the number of transferring units is two, the two transferring units being a first transferring unit and a second transferring unit, the first transferring unit being adapted to transfer a first TCP from the first supplying unit to the pressing assembly while the second supplying unit provides a second TCP to the second transferring unit.

16. The system of claim 7, wherein the pressing unit comprises:

a fixed stage for supporting the TCP; and a moving stage for moving the LC display panel assembly to the fixed stage.

* * * * *